Nov. 26, 1929.   J. E. ESHBAUGH   1,737,303
AMMETER—MAGNETIC POINTER TYPE
Filed July 15, 1927

Inventor
Jesse E. Eshbaugh
By Blackmore, Spencer & Hulh
Attorneys

Patented Nov. 26, 1929

1,737,303

UNITED STATES PATENT OFFICE

JESSE E. ESHBAUGH, OF FLINT, MICHIGAN, ASSIGNOR TO A C SPARK PLUG COMPANY, OF FLINT, MICHIGAN, A COMPANY OF MICHIGAN

AMMETER—MAGNETIC-POINTER TYPE

Application filed July 15, 1927. Serial No. 206,002.

This invention relates to an ammeter and more particularly to an ammeter of the type ordinarily provided on the dashboard of an automobile to indicate the direction and magnitude of the flow of current through the electrical system.

Ammeters of this type must necessarily be simple and inexpensive. The problem dealt with in the present case is one of elimination of unnecessary parts. The ordinary ammeter of this type is mounted in a small case and includes a permanent magnet, a conductor of the current to be measured, and a needle for indicating the magnitude and direction of the current. Heretofore, a magnetic armature has been necessary, the armature and needle being mounted on the same shaft. The needle is ordinarily made of aluminum. I avoid the need of an armature by extending the conductor directly under the dial and by making the needle of magnetic material. I thus simplify the structure by eliminating a hitherto necessary part.

Other objects of the invention will appear in the course of the following description, taken in connection with the accompanying drawing and appended claims.

Figure 1:
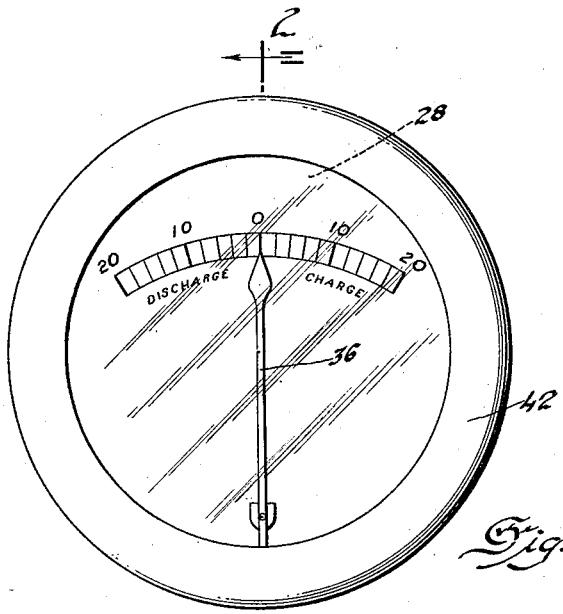
Figure 1 is a plan view.
Figure 2:
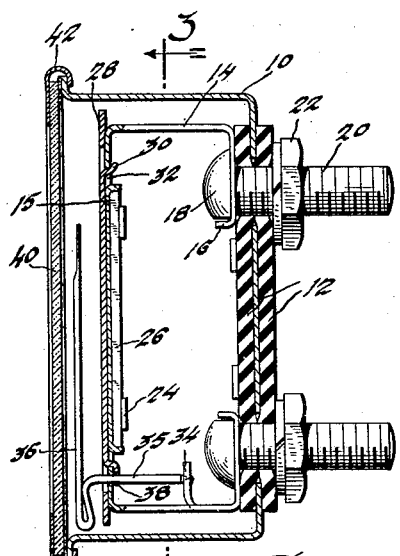
Figure 2 is a section on the line 2—2 of Figure 1.
Figure 3:
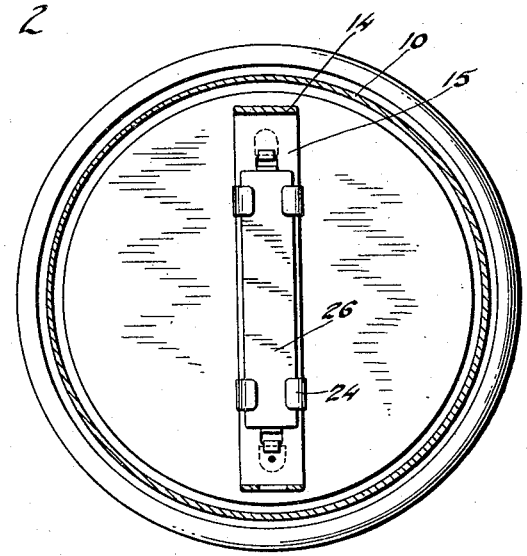
Figure 3 is a section on the line 3—3 of Figure 2.

Referring to the drawing, the numeral 10 indicates the cup-shaped case which is bent out or flanged about its rim. The case is ordinarily of aluminum and is provided on its base with two vertically spaced apertures for the reception of the terminal bolts. On either side of the base of the case I provide two apertured strips 12 of insulating material. At 14 I have indicated the substantially U-shaped conductor which is provided with feet at each leg of the U and with upturned flanges 16 for fitting against the straight side of the head 18 of the terminal bolt 20. As shown in Figs. 2 and 3, the conductor 14 is positioned in a plane which passes substantially through the diameter of the casing 10. Nuts 22 serve to hold the terminal bolts in place. The part 15 of the conductor which is adjacent the face of the instrument is provided with clips 24 by means of which a bar magnet 26 is held on the under-side of the conductor. A dial 28 composed of non-magnetic non-conducting material is fixed to the conductor by means of bent down portions or ears 30 extending through apertures 32 in the conductor. The horizontal lower side of the conductor is provided with an upwardly extending portion or ear 34 which is prick punched to provide a bearing surface for the end of the shaft 35 of the pointer or needle which extends through corresponding bearing apertures in the dial and conductor and is perpendicular thereto. The pointer or needle 36 extends at right angles to the shaft 35 and swings in a plane parallel to the dial and about the shaft 35 as an axis. The needle is of magnetic material. While I have shown the needle as formed of a single element, it is obvious that it may be formed of two elements, it being necessary only that the indicating portion 36 be of magnetic material. While the pull of the magnet is ordinarily sufficient to hold the needle in position, I prefer to provide a friction washer 38 on the shaft 35 to insure that the needle will not be jarred out of its bearings. The usual glass cover plate 40 and bezel 42 are provided for making the case dust proof.

While I have shown but a single turn of the conductor on the underside of the dial it is obvious that the conductor may be formed in a coil with more than one strand in propinquity to the indicating needle.

The operation of my device is as follows: When the current passes through the conductor, the resulting lines of force about the part 15 swings the needle 36 to the right or left, depending on the direction of the current, a distance directly proportional to the magnitude of the current and the intensity of the resulting magnetic flux about the operating section 15 of the conductor. While I have shown my ammeter as mounted in a case, it is obvious that my invention may be used in an ammeter mounted directly on an instrument panel or the dashboard without the usual case.

I claim:

1. An ammeter comprising a conductor, a permanent magnet fixed adjacent thereto, and a pivoted needle of magnetic material extending along the axis of said conductor.

2. An ammeter comprising a conductor, a needle of magnetic material mounted to swing in a plane adjacent said conductor, and a permanent magnet fixedly mounted adjacent said conductor for normally holding said needle coaxial with said conductor.

3. An ammeter comprising a conductor, a needle of magnetic material pivotally mounted on said conductor for swinging in a plane adjacent said conductor, and a permanent magnet mounted adjacent said conductor for normally holding said needle coaxial with said conductor.

4. An ammeter comprising a conductor, a needle of magnetic material mounted to swing in a plane adjacent said conductor, and a permanent magnet mounted on said conductor for normally holding said needle coaxial with said conductor.

5. An ammeter comprising a conductor, a needle of magnetic material pivotally mounted on said conductor to swing in a plane adjacent said conductor, and a permanent magnet mounted on said conductor for holding said needle coaxial with said conductor.

6. An ammeter comprising a conductor, a dial fixed to said conductor, a needle of magnetic material pivoted to swing in a plane parallel with the dial, and a permanent magnet fixed with relation to the conductor for normally holding said needle coaxial with said conductor.

7. In an ammeter having no armature, said ammeter comprising a conductor, a dial mounted thereon, a needle of magnetic material pivotally mounted on said conductor to swing in a plane substantially parallel with the dial, and a permanent magnet fixedly mounted with relation to the conductor for holding said needle coaxial with said conductor.

8. In an ammeter having no armature, said ammeter comprising a conductor, a dial mounted thereon, a needle of magnetic material pivotally mounted on said conductor to swing in a plane substantially parallel with the dial, and a permanent magnet mounted on said conductor for holding said needle coaxial with said conductor.

9. An ammeter comprising a case, a conductor within said case and having terminals extending outside thereof, a needle of magnetic material mounted on said conductor for swinging in a plane adjacent thereto, a permanent magnet fixed with relation to the conductor for normally holding said needle coaxial with the conductor, and a dial for indicating the position of the needle.

In testimony whereof I affix my signature.

JESSE E. ESHBAUGH.